(12) United States Patent
White et al.

(10) Patent No.: US 12,327,233 B2
(45) Date of Patent: Jun. 10, 2025

(54) SYSTEMS AND METHODS FOR TERMINAL DEVICE ATTESTATION FOR CONTACTLESS PAYMENTS

(71) Applicant: Stripe, Inc., South San Francisco, CA (US)

(72) Inventors: Maggie White, South San Francisco, CA (US); Kelly Moriarty, South San Francisco, CA (US); Ross Favero, South San Francisco, CA (US); Nicole DeBickes, South San Francisco, CA (US)

(73) Assignee: STRIPE, INC., South San Francisco, CA (US)

( * ) Notice: Subject to any disclaimer, the term of this patent is extended or adjusted under 35 U.S.C. 154(b) by 303 days.

(21) Appl. No.: 17/976,432

(22) Filed: Oct. 28, 2022

(65) Prior Publication Data
US 2024/0144232 A1    May 2, 2024

(51) Int. Cl.
*G06Q 20/32* (2012.01)
*G06Q 20/38* (2012.01)
(Continued)

(52) U.S. Cl.
CPC ......... *G06Q 20/327* (2013.01); *G06Q 20/326* (2020.05); *G06Q 20/3823* (2013.01);
(Continued)

(58) Field of Classification Search
CPC ............... G06Q 20/327; G06Q 20/326; G06Q 20/3823; G06Q 20/389; G06Q 20/401;
(Continued)

(56) References Cited

U.S. PATENT DOCUMENTS

| 11,979,389 B1* | 5/2024 | John Thomas | H04W 12/03 |
| 2016/0253664 A1* | 9/2016 | Yuan | G06Q 20/3226 |
| | | | 705/71 |

(Continued)

FOREIGN PATENT DOCUMENTS

| CN | 110691265 A | 1/2020 | |
| WO | WO-2022225739 A1 * | 10/2022 | H04L 63/0421 |

OTHER PUBLICATIONS

International Search Report and Written Opinion for related PCT Application No. PCT/IB2023/060869, mailed on Dec. 8, 2023, 14 pages.

*Primary Examiner* — Courtney P Jones
(74) *Attorney, Agent, or Firm* — Womble Bond Dickinson (US) LLP

(57) ABSTRACT

A method and apparatus validating integrity of an environment of a terminal device remote to a commerce platform system are described. The method can include receiving, from the terminal device, a device provisioning request that comprises data indicative of an instance of an application installed on the terminal device, a first public key, a second public key, and a hardware attestation key, the first public key, the second public key, and the hardware attestation key generated within a trusted execution environment of the terminal device, and the first public key and the second public key having a corresponding first private key and second private key stored within the trusted execution environment. The method may also include verifying the first public key and the second public key as being generated by the trusted execution environment of the terminal device using the hardware attestation key, the hardware attestation key generated at least in part using the first public key, the second public key, and the data indicative of the instance of the application.

20 Claims, 8 Drawing Sheets

(51) Int. Cl.
   *G06Q 20/40*      (2012.01)
   *H04L 9/08*       (2006.01)
   *H04L 9/32*       (2006.01)

(52) U.S. Cl.
   CPC ......... *G06Q 20/389* (2013.01); *G06Q 20/401* (2013.01); *H04L 9/0825* (2013.01); *H04L 9/3247* (2013.01); *G06Q 2220/00* (2013.01)

(58) Field of Classification Search
   CPC .. G06Q 2220/00; H04L 9/0825; H04L 9/3247
   See application file for complete search history.

(56) References Cited

U.S. PATENT DOCUMENTS

| | | | |
|---|---|---|---|
| 2017/0155513 A1* | 6/2017 | Acar | G06Q 20/20 |
| 2019/0020647 A1* | 1/2019 | Sinha | G06F 21/73 |
| 2019/0052469 A1* | 2/2019 | Scarlata | H04L 9/302 |
| 2019/0318342 A1* | 10/2019 | Mushing | G06Q 20/20 |
| 2020/0067897 A1* | 2/2020 | Smirnoff | H04L 63/062 |
| 2020/0344072 A1* | 10/2020 | Yan | H04L 9/3231 |
| 2022/0270064 A1* | 8/2022 | Cat | G06Q 20/20 |
| 2022/0300942 A1 | 9/2022 | Akgun et al. | |
| 2022/0385467 A1* | 12/2022 | Ramadasse | H04L 9/3268 |

\* cited by examiner

SYSTEMS AND METHODS FOR TERMINAL DEVICE ATTESTATION FOR CONTACTLESS PAYMENTS

BACKGROUND

Merchants, such as grocers, car services, dry cleaning services, etc., provide their products and services to customers for a fee. To collect fees for products or services provided, a merchant will typically enter an amount to be collected in a point of sale (POS) device, the POS device will communicate this data to a reader, and the card will collect payment data, such as Europay, Mastercard, Visa, etc. data collected from a credit, debit, gift card, electronic benefits, or other payment instrument provided by the customer. In some systems, the payment data may be collected via a contactless reader, where payment data is exchanged with a mobile device, an EMV chip, smart card, or other payment source that exchanges near field communications with a contactless reader. That payment data is then used by the POS device and/or the card reader to authorize the transaction, for example by a commerce platform system, and ultimately approve and charge the fee for the merchant with banks and/or card providers.

Often, merchants will prefer to use consumer off-the-shelf devices, which are non-purpose built devices such as smart phones, tablets, POS devices, etc., to perform the payment data collection noted above. However, when using an off-the-shelf device to collect payment data during transactions, the technical problem of authenticating the device and ensuring integrity of the device become paramount concerns that are often legally required. That is, trust must be established in not only the device, but also the software running on the device and the protocols for communicating sensitive payment data with remote systems (e.g., a commerce platform system) before the collection of any payment information that ensure the device has not been compromised. Furthermore, the transaction process must also be associated with sufficient guarantees of trust to protect sensitive payment data communicated over a computer network. To complicate the technical challenge noted above, the guarantees of trust and securing of information exchanged over a network are performed by remote devices communicating with one another over a network, and thus the ability to authenticate a device, software on the device, secure exchanged information, etc. become increasingly more challenging.

The increased security demands, which are to be enforced with consumer off-the-shelf devices remotely, by for example a commerce platform system, to establish trust in order to take and communicate sensitive payment data is therefore a technical challenge urgently to be addressed.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
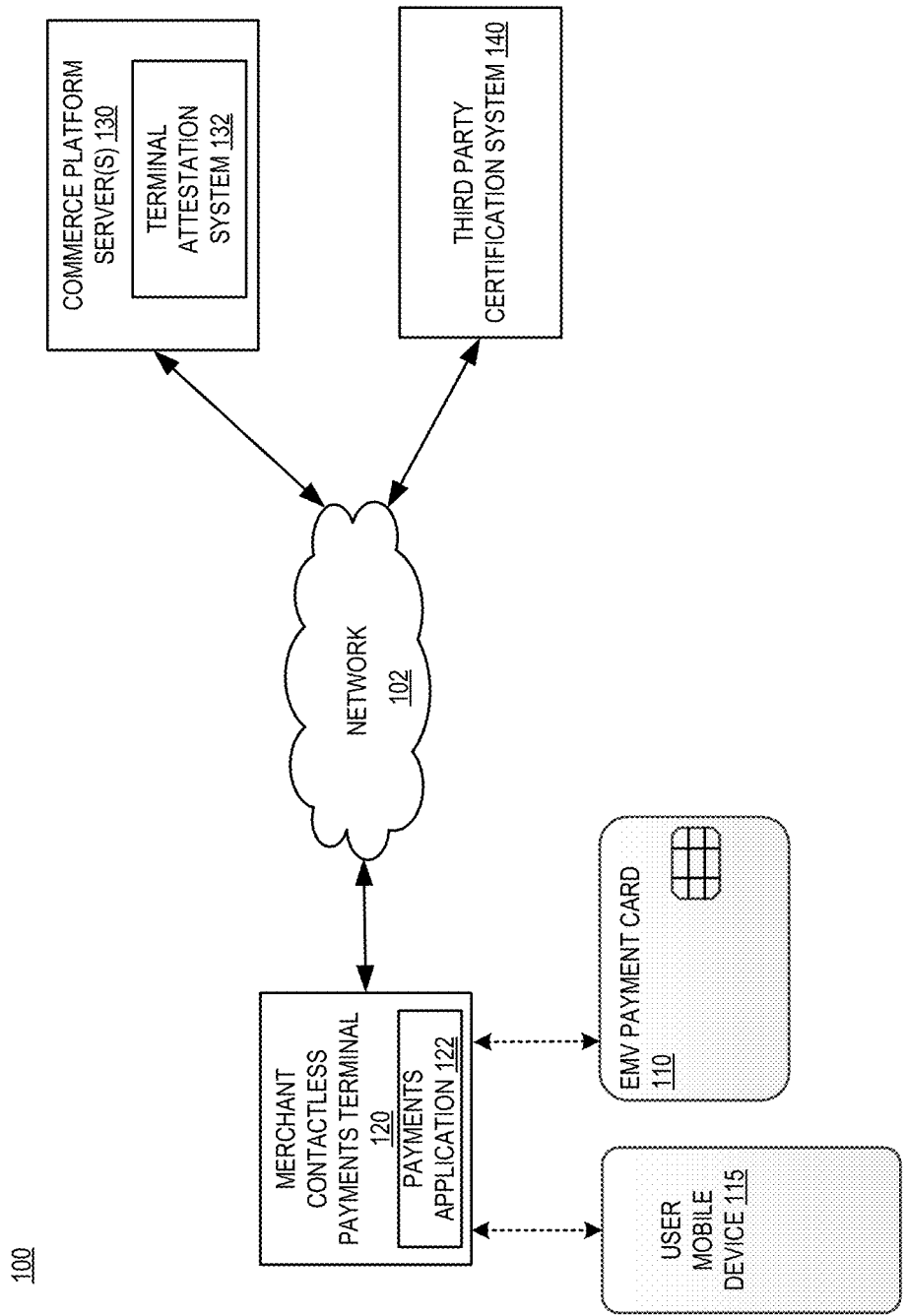
FIG. 1 is a block diagram of an exemplary system architecture for terminal device attestation for accepting and processing contactless payments.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "verifying", "storing", "validating", "comparing", "encrypting", "decrypting", "transmitting", "generating", "using", "extracting", "accessing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 is a block diagram of an exemplary system architecture for terminal device attestation for accepting and processing contactless payments. In embodiments, the terminal device is used to collect and processing merchant payments using the services of a commerce platform system.

In one embodiment, the system includes a merchant contactless payments terminal 120 (hereinafter referred to as "terminal 120"), one or more commerce platform server(s) 130, and a third party certification system 140. In one embodiment, terminal 120 may be an off-the-shelf computing device, such as a smartphone, tablet computer, laptop computer, or other hardware device that can accept contactless payments and communicate with the services of the commerce platform server(s) 130, as discussed in greater detail below. In one embodiment, as discussed below, the terminal device 120 may interact with one or more of a user mobile device 115, EMV payment card 110, or other contactless payment device using wireless communications systems (e.g., near field communications), to accept contactless payments using a reader and a payments application of the terminal 120. In embodiments, the application may be a merchant application integrating functions of a software development kit (SDK) of the commerce platform server(s) 130, where the SDK of the commerce platform server(s) 130 exposes payment processing functions for use by the terminal 120. Furthermore, the SDK of the application 122 establishes trust in the environment in which the application is installed and executed on the device by ensuring the device has not been tampered with (e.g., verification of an operating system, verification of freedom from boot loader tampering, etc.), the application is the application seeking to perform a transaction (e.g., verification of an identity of an application associated with one or more encryption keys), and the SDK has not been tampered with, and thus the transaction process is trustable by utilizing the attestation processes discussed herein. An embodiment of the terminal device 120 is illustrated and discussed below in FIG. 6.

Furthermore, commerce platform server(s) 130 and third party certification system 140 are also computing devices, such as server computers, desktop computers, distributed service systems, etc. that include typical computing hardware, as illustrated and as discussed below for FIG. 7.

The terminal 120, commerce platform server(s) 130, and third party certification system 140 may be coupled to a network 102 and communicate with one another using any of the standard protocols for the exchange of information. In one embodiment, one or more of the terminal 120, commerce platform server(s) 130, and third party certification system 140 may run on one Local Area Network (LAN) and may be incorporated into the same physical or logical system, or different physical or logical systems. Alternatively, one or more of the terminal 120, commerce platform server(s) 130, and third party certification system 140 may reside on different LANs, wide area networks, cellular telephone networks, etc. that may be coupled together via the Internet but separated by firewalls, routers, and/or other network devices. In one embodiment, commerce platform server(s) 130 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc. Furthermore, in embodiments, terminal 120, commerce platform server(s) 130, and third party certification system 140 may communicate with one another via network 102 using various protocols for the exchange of information, such as secure protocols including TLS, SSL, SSH, etc.

In an embodiment, terminal 120 is a consumer off-the-shelf device (COTS device), such as mobile phone, tablet computing device, or other device. Furthermore, the terminal 120 is associated with a merchant system (not shown) that has installed a payments application 122 for accepting and processing payments using the services of commerce platform server(s) 130. For example, and as discussed below, this can include a payments application 122 incorporating functions, processes, etc. of an SDK distributed by the commerce platform server(s) 130 exposing payment processing services of the commerce platform server(s) 130 to the terminal 120. The payments application 122, as discussed herein, leverages a trusted execution environment (not shown in FIG. 1) of the terminal 120 to bootstrap trust in the payments application, integrity of the device, the SDK within the application, and encryption of communications exchanged with commerce platform server(s) 130 that include payments data and/or other transaction data, as discussed further below.

In embodiments, the SDK functions of the payments application interact with the terminal attestation system 132 to initially establish a unique identity of the device by communicating one or more identifiers, such as device identifier(s), operating system identifier(s), application installation identifier(s), etc. with the terminal attestation system 132. The SDK of the payments application 122 causes the trusted execution environment of the terminal 122 to generate encryption key pairs, such as RSA or other key types, where the private keys are stored and maintained within the trusted execution environment, and the public keys are provided to the terminal attestation system 130. Furthermore, a signature is also generated by the trusted execution environment as an attestation of the authenticity of the generated keys. These identifier(s) and signature are encrypted using one of the private keys, and transmitted with the corresponding public key to the terminal attestation system 132. Upon decryption using the received public key, the signature (e.g., a signature, hash, etc. generated using data indicative of device identifier, expected device properties, expected device software, etc. generated within the trusted execution environment) may be verified with the third party certification system 140 based on the decrypted identifiers. For example, the third party certification system 140 may be GOOGLE SAFETY NET™ or another certification system, which provides services for detecting device tampering. That is, the third party certification system 140 may store certification information and verify such information by accessing non-public information based on the provided device identifier(s), accessing a signature key, and then decrypting and verifying the data within the signature. For example, one or more device properties, operating system properties, etc. may be the subject of a hash, signature, etc., and are verifiable by the third party certification system 140. The signature verification result is returned to the terminal attestation system 130, which uses a positive verification to bind the device to an application installation based on the received identifiers. That is, the identifiers of the terminal 120, identifiers of the payment application, and encryption keys are associated by the commerce platform server(s) 130 with the terminal 120 to bind the specific terminal 120 to a specific identified device and software installation. Furthermore, the public keys are also associated with the device for later use, to ensure that only the identified device is able to encrypt sensitive data with specific encryption keys to further ensure device identity during later transactions. In embodiments, these key pairs are generated once during this provisioning and binding phase of the terminal 120.

After the provisioning and binding of the terminal device 120, the SDK functions of the payments application 122 further requests the terminal attestation system 130 to generate one or more symmetric encryption keys. These keys will be used to protect device signal data (e.g., collected payments data, transaction details, etc.) when communicated between terminal 120 and commerce platform server(s) 130 over network 102. These symmetric key(s), which may be for example AES keys, are temporary keys and rotated on a periodic basis at the request of the SDK of the payments application 122 (e.g., for example at the expiration of a cryptogram, which is generated per the discussion below). In response to the request, terminal attestation system 132 generates the symmetric key(s), stores an association between the generated key(s) and the terminal 120 (e.g., with one or more of the software, application, device identifiers), encrypts the key using one of the previously received public keys associated with the terminal 120, encrypts the payload with another of the previously received public keys associated with the terminal 120, and transmits the encrypted payload to the terminal 120. The terminal 120 may then decrypt the payload using a first private key using the trusted execution environment, and decrypt the symmetric key within the payload using a second private key stored in the trusted execution environment. The use of the previously generated private keys forming the key pairs enables the terminal 120 and the trusted execution environment to authenticate both the message payload (e.g., first decryption operation), and the second encryption key within the payload (e.g., second decryption operation). Furthermore, the terminal attestation system 132 using the encryption keys bound to the specific terminal 120 (e.g., with corresponding private keys in a trusted execution environment), ensures that only the identified terminal 120 is able to decrypt and then use the symmetric keys during a transaction. This decrypted symmetric key(s) are then stored as plaintext within the trusted execution environment, and not accessible by any function, service, or hardware outside of the trusted execution environment.

With the exchange and authentication of the symmetric encryption keys, the terminal 120 may then complete device attestation to validate the integrity of the environment (e.g., terminal, application, and SDK within the application) of the terminal 120. This is an operation that is to be performed before any transaction can be performed by the payments application 122. The payments application 122 using the SDK functions collects one or more device signals, signature, and attestations (e.g., signature, certificate chains, etc.), from third party certification system 140. This information is collected into an attestation request, encrypted with a first private key of the trusted execution environment, the encrypted payload signed with a second private key of the trusted execution environment, and transmitted to the terminal attestations system 132. The terminal attestation system 132 decrypts and verifies the signature by accessing the public keys associated with terminal 120/application 122, and decrypts the message payload to access the encrypted signals, signature, and attestations. This information is then used by the terminal attestation system 130 to verify the signals with previously collected device/application information and/or with the third party certification system 140, and further to verify the attestations at the third party certification system 140. These checks enable terminal attestation system 132 to verify the integrity of the device, software installed on the device, and trust that only the subject device (e.g., terminal 120) is able to use the keys bound to the device. Furthermore, in response to successful verification, terminal attestation system 132 generates an attestation cryptogram including data, such as a key ID of the key used to encrypt data, an expiration time, a session identifier, and an identifier of a symmetric key, which is encrypted using a public key of one of the previously generated key pairs. The encrypted cryptogram is returned to the terminal device 120, for decryption (using a private key maintained in the trusted execution environment) and storage within the trusted execution environment.

The generation of the cryptogram by the terminal attestation system 132, and receipt and storage of the cryptogram by the terminal 120, completes the device attestation. That is, the payments application 122 may then use the cryptogram by sending it with transaction messages during transactions because the device, software on the device, and identity of the device as being associated with specific encryption keys have all been established with sufficient guarantees of trust. The transaction messaging, for example upon collection of payment data from user mobile device 115, EMV payment card 110, or other device during a transaction, utilizes the private encryption key to encrypt the transaction message payload, including any collected payment data, transaction data, a transaction session identifier, and the cryptogram. The encrypted transaction message is then sent to the commerce platform server(s) 120.

A payments system (not shown) of the commerce platform server(s) 120 uses the terminal attestation system 132 to decrypt the transaction message, and verify the information within the cryptogram including ensuring the cryptogram is still valid based on the expiration data, the received session identifier matches that in the cryptogram, the requesting device's signature matches that in the cryptogram (e.g., the cryptogram was generated for terminal 120), and the key identifier matches that in the cryptogram. If any non-matches are detected the transaction is aborted, and one or more notification messages are sent to systems of the commerce platform server(s) 130 that are responsible for attending to potentially fraudulent transactions. Otherwise, when all factors of the cryptogram match their expected values, the transaction may proceed.

Thus, in embodiments, the terminal 120 being a COTS device integrated with the SDK functions of the commerce platformer server(s) 120 enables the attestation of device integrity, software integrity, operating system integrity, SDK integrity, and encryption key integrity remotely by the commerce platform server(s) 120. The commerce platform server(s) 120 achieves this confidence in the various integrity checks by leveraging the abilities of the trusted execution environment to securely store various encryption keys used for messaging before transactions, during periodic key generations, and during transactions, as well as the attestations of the third party certification system 140. Thus, the commerce platform server(s) 120 and protocols used to bind the terminal device 120 with a payments application 122, generate messaging keys, periodically generate transaction keys, exchange a cryptogram for a transaction, and other operations discussed herein provide sufficient and redundant guarantees of integrity of the device to secure payment data collected during transactions. Furthermore, these redundant sources of trust may be established and verified remotely during remote transactions to address the technical challenged discussed herein.

Figure 2:
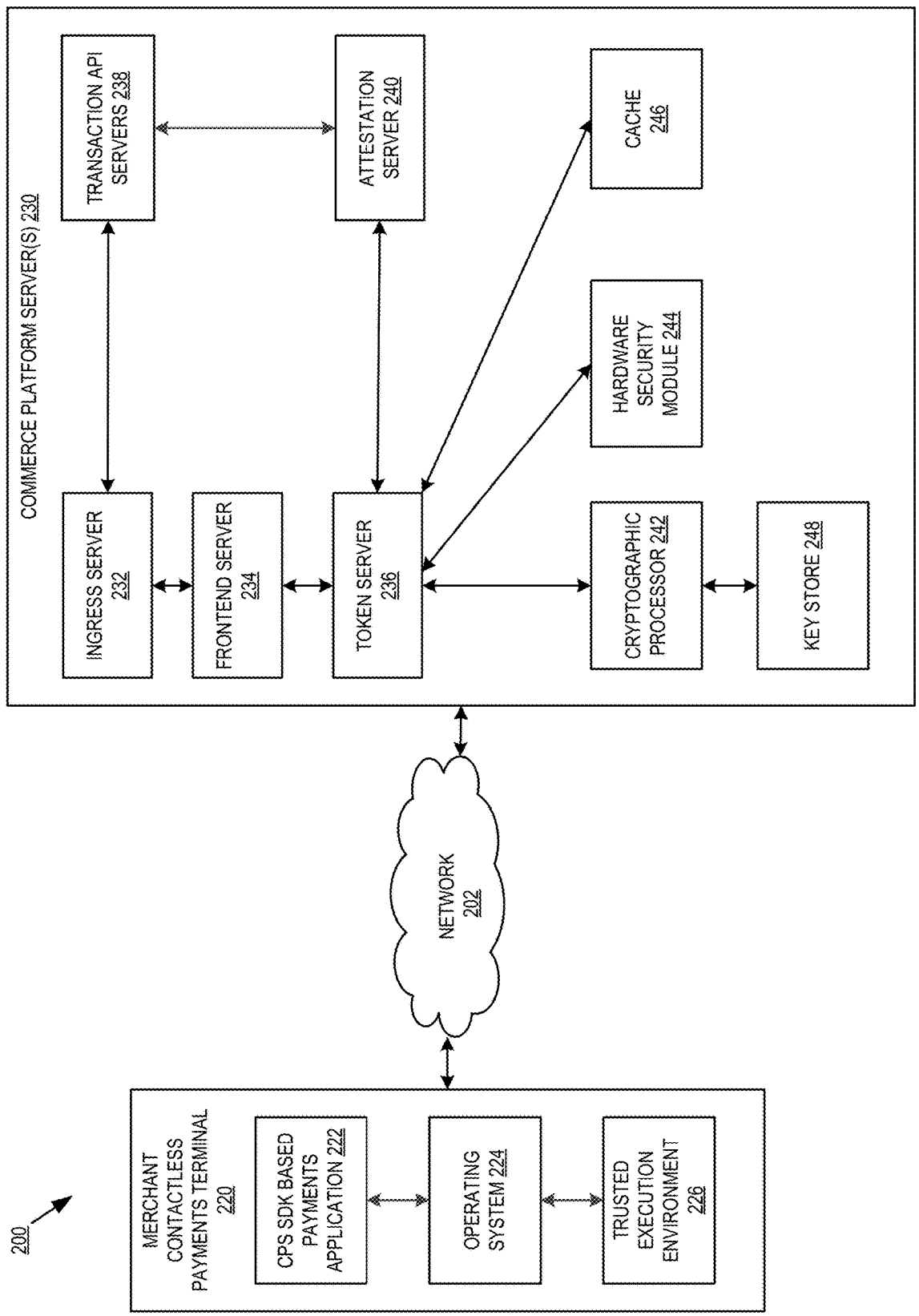
FIG. 2 is a block diagram of one embodiment of a commerce platform server(s) that enables remote attestation of a merchant contactless payments terminal.

FIG. 2 is a block diagram of one embodiment 200 of commerce platform server(s) 230 that enables remote attestation of a merchant contactless payments terminal 220. The commerce platform server(s) and merchant contactless payments terminal 220 (hereinafter "terminal 220") provide additional details of the commerce platform server(s) 130 and terminal 120 discussed above.

In embodiments, terminal 220 is a consumer off-the-shelf hardware device, such as a smartphone, tablet computer, point of sale device, or other device having wireless communications capabilities (e.g., a reader) for collecting payments information during a transaction, as well as network communications capabilities for interacting with commerce platform server(s) 230, as discussed herein. The terminal 220 has additional hardware components, such as one or more processors, memory, a bus, communications interface, and other hardware components associated with such terminal device(s).

The terminal 220, in embodiments includes an operating system 224, such as the ANDROID™ operating system. The operating system 224 may include functions for interacting with the trusted execution environment 226. The trusted execution environment is a partition, portion, or other secure environment of the terminal device 220 which is not accessible to any hardware or software of the terminal 220 or outside devices, except through the functions provided by the operating system 224. Thus, the storage, operations, software, etc. of the trusted execution environment 226 are protected by a barrier in that the trusted execution environment 226 will not process any request not originating from specific functions of the operating system 224. Furthermore, any intrusion on the memory and/or processes of the trusted execution environment 226 are detectable using a third party certification system 140, the trusted execution environment itself, and the functions of the operating system 226, thus enabling a compromised device to be identifies and disabled from performing transactions.

The commerce platform sever(s) software development kit (CPS SDK) payments application 222 leverages the security, sanctity, and capabilities of the trusted execution environment 226 by interacting with the trusted execution environment to generate encryption keys, store private keys within the trusted execution environment (preventing exposure to any hardware or software outside of the trusted execution environment), perform encryption operations, generate signatures and/or certificates verifiable by a third party certification system 140. Thus, the CPS SDK payments application 222 accesses the functions for requesting the various operations of the trusted execution environment 226, as will be discussed in greater detail below in FIGS. 4A-4D, to provide for device, software, and encryption key attestation during transactions.

Furthermore, CPS SDK payments application 222 further utilizes the SDK to communicate with one or more servers of the commerce platform server(s), such as the ingress server 232, frontend server 234, and token server 236. In embodiments, the CPS SDK payments application 222 is configured to utilize an application programming interface (API) of the commerce platform server(s) 230 to generate and/or receive API messages sent to or received from endpoints of the ingress server 232, frontend server 234, and token server 236. Thus, the CPS SDK payments application 222 leveraging the capabilities of the trusted execution environment 226 further communicates various data, keys, certificates, signatures, etc. for the attestations discussed herein.

Commerce platform server(s) 230 includes a plurality of systems, such as the ingress server 232, frontend server 234, token server 236, transaction API servers 238, attestation server 240, cryptographic processor 242, hardware security module (HSM) 244, cache 246, and key store 248. These systems collectively form the terminal attestation system 132 discussed above. Furthermore, each of these servers, processors, HSMs, cache, data store, etc. may be distributed among several devices, and may be instances of the corresponding servers, processors, HSMs, cache, data store, etc. distributed among the several devices. However, even when distributed, the information exchanges, messaging, encryptions, verifications, etc. discussed below for device binding (e.g., FIG. 4A), data key rotation (e.g., FIG. 4B), attestation (e.g., FIG. 4C), and transaction processing (e.g., FIG. 4D) form protocols that securely and reliably establish trust in a device, its software, and a transaction process between the device and commerce platform server(s) 230.

The operation of the ingress server 232, frontend server 234, token server, transaction API servers 238, attestation server 240, cryptographic processor 242, hardware security module (HSM) 244, cache 246, and key store 248, as well as the operations of the CPS SDK based payments application 222, operating system 224, and trusted execution environment 226 are discussed in detail below throughout FIGS. 4A-4D.

Figure 3:
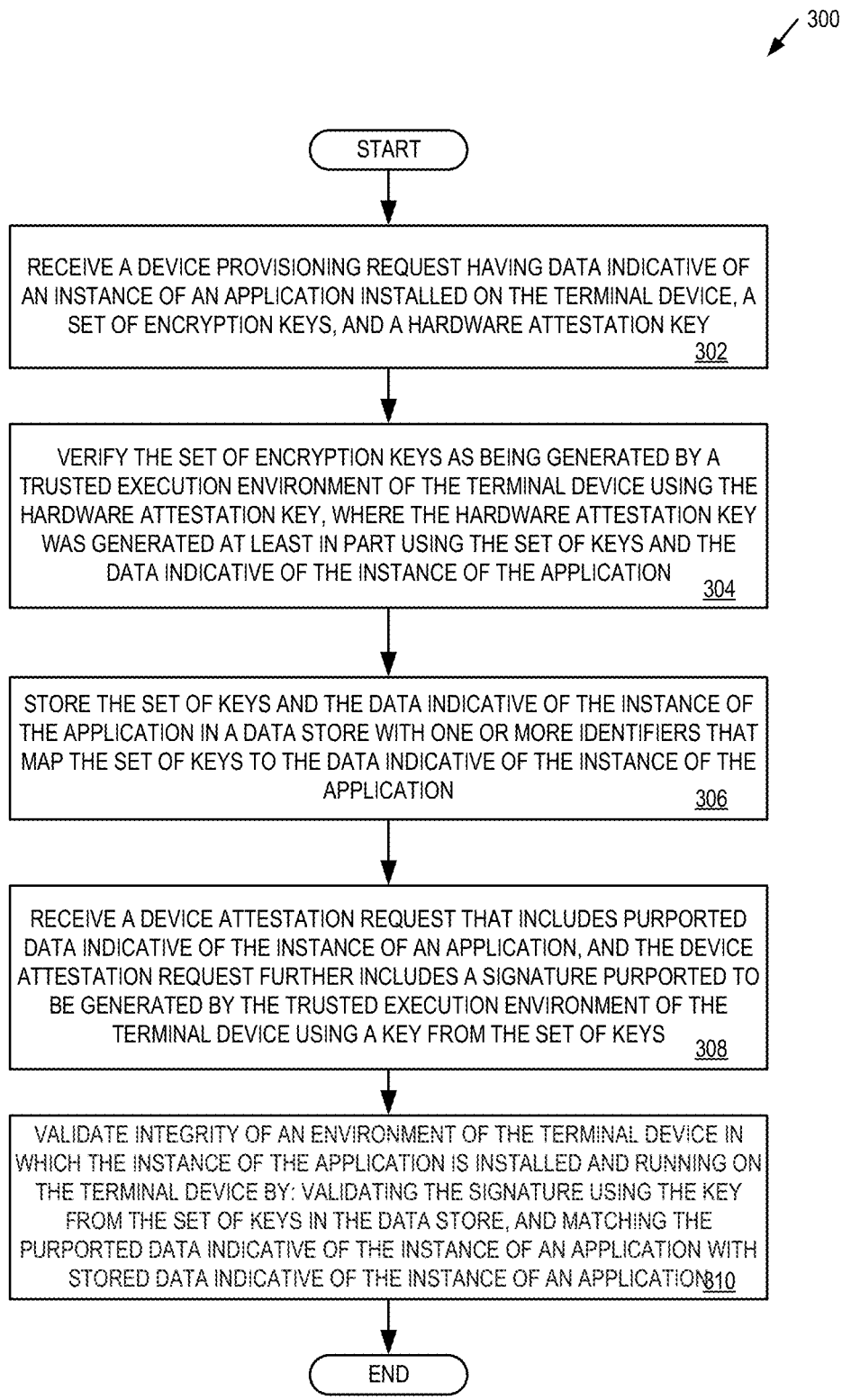
FIG. 3 illustrates one embodiment of a method for performing terminal device attestation.

FIG. 3 illustrates one embodiment of a method 300 for performing terminal device attestation. The method 300 is performed by processing logic that may comprise hardware (circuitry, dedicated logic, etc.), software (such as is run on a general-purpose computer system or a dedicated machine), firmware, or a combination thereof. In one embodiment, the method 300 is performed by commerce platform server(s) and a terminal (e.g., commerce platform server(s) 130 or 230 and terminal 120 or 220).

Referring to FIG. 3, processing logic of the reader device begins by receiving a device provisioning request having data indicative of an instance of an application installed on the terminal device, a set of encryption keys, and a hardware attestation key (processing block 302). The device provisioning request is generated by a CPS SDK based payments application (e.g., payments application 222) in response to a first or initial operation of the CPS SDK based payments application for the terminal device. For example, a COTS device may have the CPS SDK based payments application installed to enable the COTS device to perform payments transactions using the services of a commerce platform system. The CPS SDK based payments application detects that the terminal device has not been attested to (e.g., does not have encryption keys generated and stored within a trusted execution environment (TEE), has not exchanged messaging to establish data transfer keys, etc.). Upon detecting this, the CPS SDK based payments application generates the device provisioning request, with the various attestation data, keys, etc., the generation of which is further discuss below in FIG. 4A.

Processing logic then verifies the set of encryption keys as being generated by a trusted execution environment of the terminal device using the hardware attestation key, where the hardware attestation key was generated at least in part using the set of keys and the data indicative of the instance of the application (processing block 304). The hardware attestation key, in embodiments is generated by the TEE for the device provisioning request, and may be tied to a device certificate verifiable by a third party certificate system. That is, one or more characteristics, properties, identifiers, etc. are used to generate one or more certificate(s) and/or signature (s) enabling the third party certificate system to verify the identity of the device and integrity of systems (e.g., processors, operating system, memory, etc.) of the terminal device. For example, one or more certificates or signatures, such as GOOGLE SAFETY NET™ certificates and/or signature may be generated for the device, device state, operating system, etc. within the TEE. Thus, verification may include communicating with the third party certificate system to obtain authentication/attestations of the received signature (s) and/or certificate(s).

Processing logic then stores the set of keys and the data indicative of the instance of the application in a data store with one or more identifiers that map the set of keys to the data indicative of the instance of the application (processing block 306). That is, because the signature(s) and/or certificate(s) are based on the device state, identifiers, etc., upon verification, the received keys, instance of the payments application, device, etc. may be bound to one another, for example by maintaining the association in a data store a commerce platform server(s). This association ensures that, for example, when a later encrypted message identifies a specific terminal device, and the encryption was performed within that device's TEE, that the keys associated with that terminal device may be accessed to decrypt the received message. If successfully unencrypted, it can be ascertained that the appropriate device having encrypted the message from within its TEE using keys not exposed outside the TEE is in fact the device that originated the message (e.g., not a spoofed, false, or otherwise nefarious device).

Processing logic receives a device attestation request that includes purported data indicative of the instance of an application, and the device attestation request further includes a signature purported to be generated by the trusted execution environment of the terminal device using a key from the set of keys (processing block 308), and validates integrity of an environment of the terminal device in which the instance of the application is installed and running on the terminal device by: validating the signature using the key from the set of keys in the data store, and matching the purported data indicative of the instance of an application with stored data indicative of the instance of an application (processing block 310). Therefore, the message having included other signatures and/or certificates and signed data enables detection of boot loader, operating system, memory, or other tampering (e.g., by verification by a third party certification system) providing a strong indication of integrity of the environment of the device in which the instance of the application is installed and running, wherein the environment includes the device (e.g., operating systems, boot loader, etc.), the instance of the application, and the SDK within the application. Furthermore, because as discussed herein, the encryption of such data relies on private keys not exposed outside of a specific devices TEE, the successful decryption serves as a strong attestation of device identity. As such, device identity and device environment integrity are attestable with sufficient guarantees of trust.

Embodiments of processes for protocols and operations performed by a merchant contactless payments terminal 220 and commerce platform server(s) 230 to support device binding (e.g., the operations of process 400 of FIG. 4A), data key rotation (e.g., the operations of process 430 of FIG. 4B), attestation (e.g., the operations of process 460 of FIG. 4C), and transaction processing message exchanges (e.g., the operations of process 480 of FIG. 4D), are discussed in greater detail below. Furthermore, the processes for protocols and operations 400, 430, 460, and 480 are performed by processing logic that may comprise hardware (circuitry, dedicated logic, etc.), software (such as is run on a general-purpose computer system or a dedicated machine), firmware, or a combination thereof. In one embodiment, the processes for protocols and operations 400, 430, 460, and 480 are performed by commerce platform server(s) and a terminal (e.g., commerce platform server(s) 130 or 230 and terminal 120 or 220).

Figure 4A:
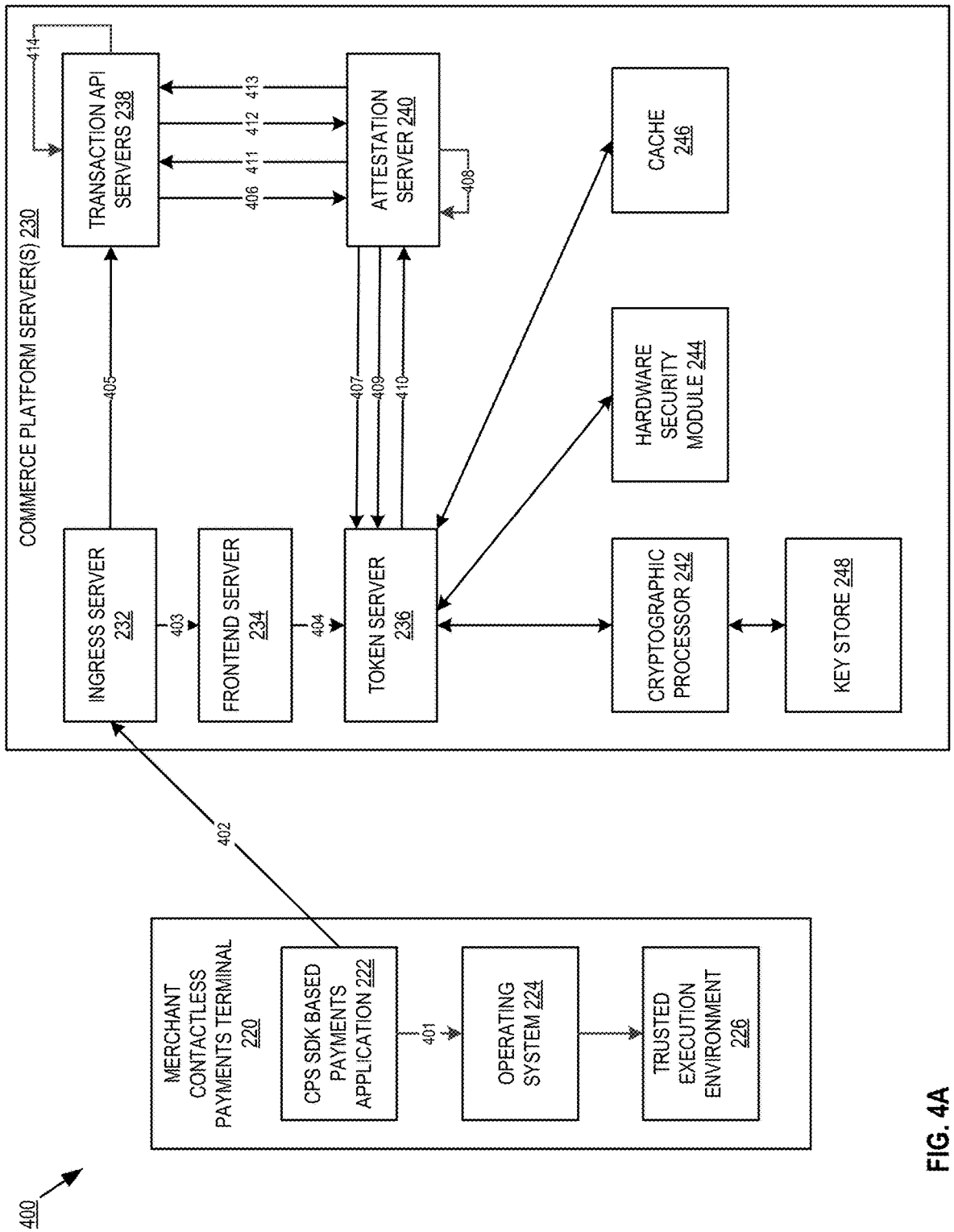
FIG. 4A illustrates one embodiment of a process for protocols and operations for terminal device binding and provisioning prior to accepting and processing contactless payments.

FIG. 4A illustrates one embodiment of a process 400 for protocols and operations for terminal device binding and provisioning prior to accepting and processing contactless payments. As will be discussed below, to create a root of trust and identification for the installation of the CPS SDK based payments application.

In embodiments, the process 400 begins the SDK 222 creating two sets of asymmetric encryption keys by invoking the TEE 2266 via the operating system 224 (operation 401). The sets of keys are respectively referred to as a Device Authentication Key (DAK) paid and a Key Transport Key (KTK) pair, and are generated within the TEE 226. The private key components of both the DAK and the KTK are stored in the TEE and never exposed outside of the TEE. For both DAK and KTK, the SDK 222 will also generate a hardware key attestation, which is a hardware backed signature generated within the TEE (and variable by a certificate system), in order to verify key integrity.

The SDK 222 then sends a provisionDevice request to the ingress server 232 of the commerce platform server(s) 230 (operation 402). This contains an application installation fingerprint (AIF), and the device's public DAK and KTK. The AIF includes, for example, a collection of properties that uniquely identify an installation of an application using the SDK, such as one or more of a unique installation id, an identifier of an application package, an application version, as well as identification data. The SDK further causes the payload of the request message to be signed with the private DAK using the TEE 226.

Ingress server 232, upon receiving the request message, validates the keys on the request to authenticate the device. If successful, ingress server 232 forwards the request to frontend server 234 (operation 234).

Frontend server 234 receives the request and calls to token server to cache the public DAK and KTK in cache 246 (operation 404). In embodiments, frontend server 234 may further redact one or more sensitive fields on the request. The optionally scrubbed request is forwarded to transaction API server(s) 238 (operation 405). In embodiments, the transaction API server(s) 238 are servers responsible for performing transaction processing operations.

The transaction API server(s) 238 forwards the request to attestation server 240 to trigger an asynchronous SDK validation (operation 406). In response to receipt of the request, attestation server 240 calls to token server 236 to load the cached public DAK and KTK from cache 246 (operation 407).

Attestation server 240 then assesses (operation 408) the integrity of the request received by validating (1) the DAK properties belong to the expected application and were created in secure hardware by verifying the key attestation's certificate chain, and (2) the KTK properties belong to the expected application and were created in secure hardware by verifying the key attestation's certificate chain. The expected application corresponds with the identified application, from which the public keys are associated, and the attestation server 240 further verifies (3) the payload signature using the public DAK. Furthermore, the key attestation's certificate chain for the DAK and/or KTK may be validated by messaging the third party certificate server 140 to verify on or more certificates.

When validation succeeds at operation 408, attestation server 240 calls to token server 236 (operation 409) to persist the public DAK and KTK into the key store 248. Thus, the keys are cached until a successful validation, and then stored in a persistent state in key store 248.

Token server 240 respond to attestation server 240 (operation 410) with key handles for the persisted public DAK and KTK. These key handles are identifiers for later requesting and/or accessing the public DAK and/or KTK in the key store 248. Attestation server 240 passes (operation 411) the key handles in a response to transaction API servers 238, which in turn writes (operation 412) a mapping of the unique device handle to the key handles to a data store of the attestation server (not shown), with a call to attestation server 240 to generate a signature for the response. A database in the commerce platform server(s), such as that maintained in key store 248 or other storage store the mapping between the unique device identifiers (e.g., of the terminal 220) and the DKS and KTK key handles for the public components of the DAK and KTK.

Attestation server 240 signs the payload with an attestation authentication key (AAK), and returns this signature to transaction API servers 238 (operation 413). In embodiments, AAK is an asymmetric key pair generated by cryptographic processor 242 with the public component being integrated into the SDK 222 upon installation, and the private component stored by the commerce platform server(s) 230 (e.g., in key store 248). Then, server responses for provisioning, key rotation, and attestation, as discussed herein, can be signed by the private component of the AAK so that the SDK can validate the signature with the public component baked into the installed SDK.

Transaction API server 238 adds the signature and continues with the response (operation 414), which is discussed below in FIG. 4B.

Figure 4B:
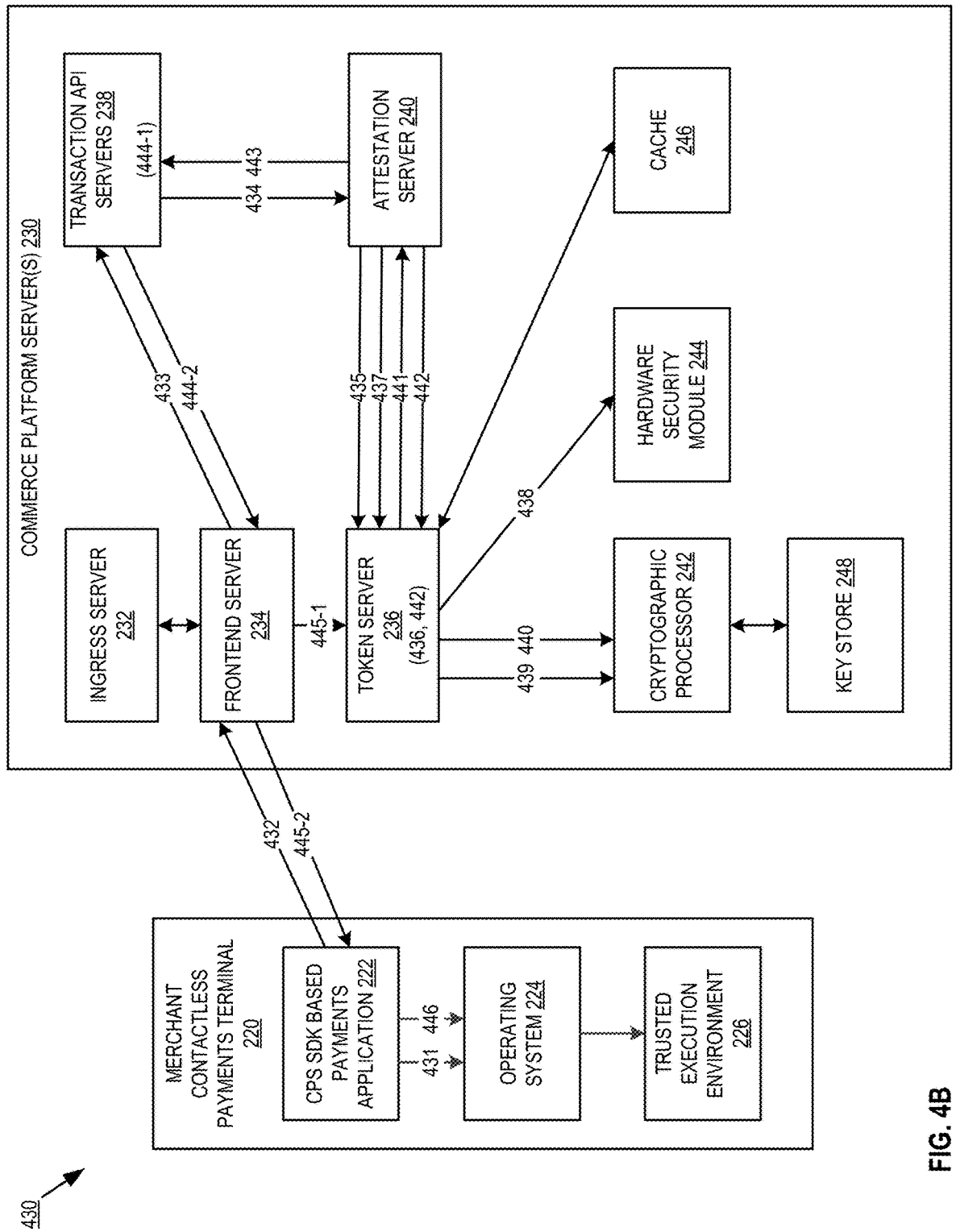
FIG. 4B illustrates one embodiment of a process for protocols and operations for data key rotation for accepting and processing contactless payments.

FIG. 4B illustrates one embodiment of a process 430 for protocols and operations for data key rotation in supporting accepting and processing contactless payments. In embodiments, the SDK 222 uses symmetric keys for protecting device signal data collected during a transaction, such as primary account number, EMV, or other sensitive data when transmitted over a network (e.g., network 102 or 202). These symmetric keys are securely generated within the hardware security module (HSM) of the commerce platform server(s) 230, protected in transit using the KTK generated above, and decrypted by/stored within terminal device's 220 TEE 226.

The process begins with the SDK 222 generating a key rotation request and calling into the TEE 226 to sign the request with the DAK (operation 431). The SDK 222 accesses these functional abilities of the TEE 226 through the functions of the operation system 224 discussed above.

The SDK 222 sends a rotateKey request to frontend server 234 (operation 432). The rotateKey request is a request that causes new symmetric keys to be generated, and which includes which key type the SDK would like to rotate (either a processing data key (PDK) used for encrypting sensitive EMV data, or an attestation data key (ADK) that encrypts device signal data prior to transmission). To avoid obscuring the present protocol and operation, the remaining discussion of FIG. 4B will use the ADK as a symmetric key example for performing symmetric key rotation. However, the same protocol and operations may be used to rotate the PDK as well consistent with the discussion herein. Ingress server 232 receives the request and validates the API keys on the request to authenticate the device, and if successful, ingress server 232 forwards the request to frontend server 234.

Frontend server 234 receives the request and forwards the request transaction API servers 238 (operation 433). Frontend servers 234 use the unique device identifiers passed in the request to look up the key handles for both the DAK and KTK, attaches the key handles to the request, and forwards the request to attestation server (operation 434). The information passed in the request enable attestation server to rebuild the request body, generates a digest from the request, and calls to token server with the specified DAK handle to validate the signature (operation 435).

Token server validates the signature by loading the public DAK from the key store 248, and comparing the signature with the provided digest (436). If the signatures match, attestation server 240 calls to token server 236 to request that the new symmetric ADK requested to be generated and encrypted with the terminal device's 220 public KTK (operation 437).

In response to this request, token server 236 calls to the HSM 244 to securely generate the ADK (operation 438). Token server then calls into cryptographic processor 242 to write the generated ADK to the data store 248 (operation 439), and to load the public component of the terminal device's 220 KTK from the key store 248 (operation 440). Token server then encrypts the ADK with the public KTK, caches the resulting ciphertext in cache 246, and returns the ciphertext, DKS key handle, and a cache ID to attestation server 240 (operation 441). Attestation server uses this data to build a response by wrapping the key in an object, such as a SecureKeyWrapper asn.1 object, generates a digest, and calls to token server 236 to sign it using the AAK (operation 442).

Attestation server then returns the scrubbed response (i.e., key handle and cache ID) to transaction PAI servers 238 (operation 443). Transaction API servers 238 persists a mapping of unique device identifiers to ADK and PDK key handles (operation 444-1), and forwards a response to frontend server (operation 444-2).

Frontend server 234 calls token server to load the ciphertext ADK from the cache, attaches it to the response (operation 445-1), and returns the full signed payload to the terminal device 220 (operation 445-2).

Upon receipt of this communication, the SDK 222 authenticates the response by validating the signature using the public AAK baked into the SDK upon installation, passes a SecureKeyWrapper containing the ciphertext ADK into to the TEE 226 for decryption (with the private KTK stored in the TEE), and storage of the resulting plaintext ADK symmetric key (operation 446).

As noted above, the operation of FIG. 4B may be repeated to generate a second key (e.g., the PDK in this example), so that terminal device 220 has both the ADK and the PDK. Furthermore, these operations may be periodically performed when, for example, symmetric keys expire (e.g., are not usable with a transaction cryptogram), for a new transaction, for a new session, etc.

Figure 4C:
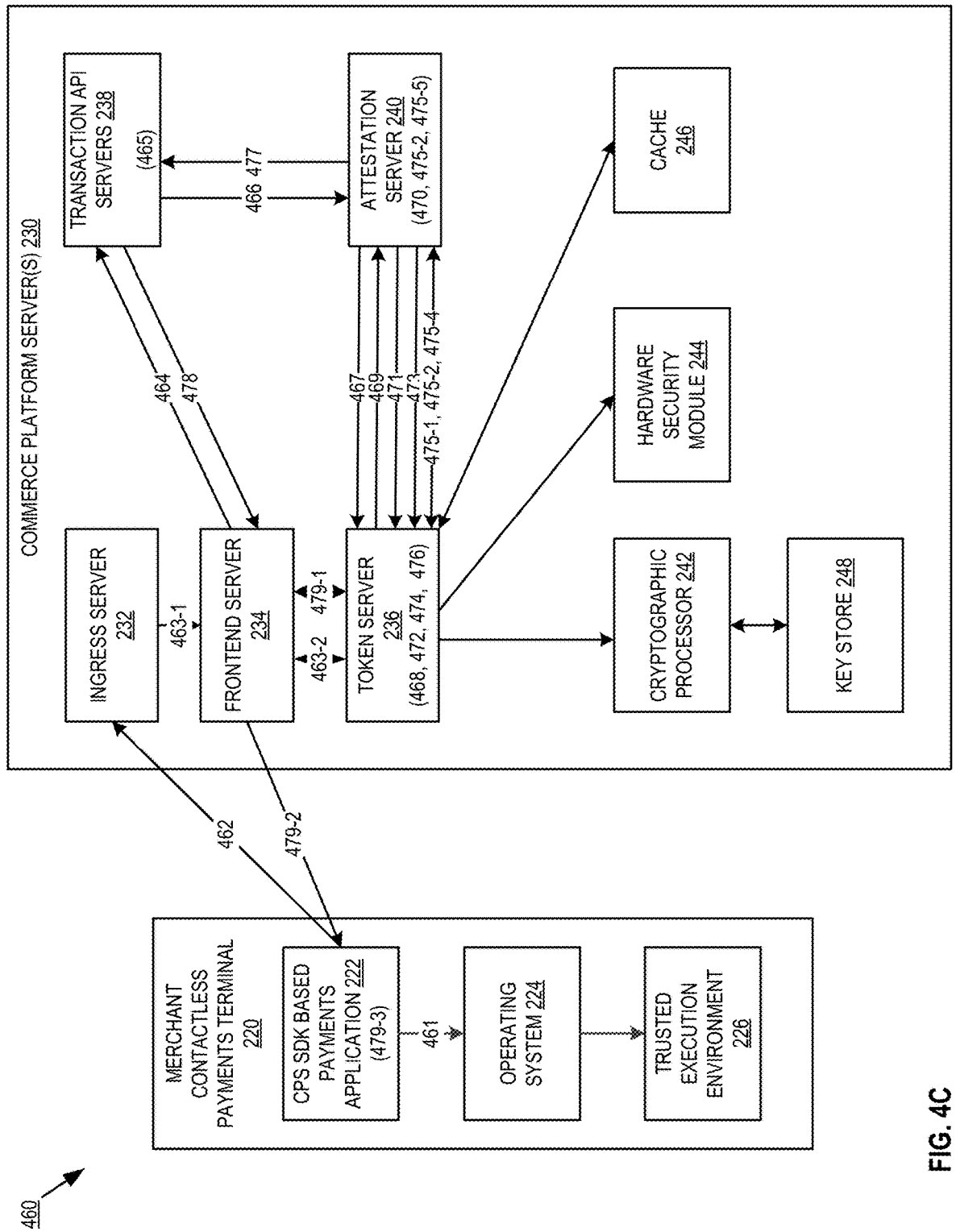
FIG. 4C illustrates one embodiment of a process for protocols and operations for an attestation process in support of accepting and processing contactless payments.

FIG. 4C illustrates one embodiment of a process 460 for protocols and operations for an attestation process in support of accepting and processing contactless payments. As discussed herein, before any transactions can be performed by terminal device 220 (e.g., collecting sensitive payment data), the SDK 222 is responsible for validating the integrity of the device.

The process begins with the SDK 222 collecting and collating device signals and calls into the TEE 226 to encrypt the signal data with the ADK (operation 461). The ADK, as discussed above, is a symmetric key generated by the HSM 244 for use when transmitting device signal data over a network. Furthermore, The TEE 226 is called to sign the request using the private DAK, which is stored security within the TEE 226 (operation 461). The device signals, in embodiments, may include one or more device characteristics, unique identifiers, sensor data, location, file system parameters, etc. that enable the device to be identified and integrity checked. In an embodiment, the signals further include a response from a third party certificate system, such as a cryptographic nonce for validation purposes.

The SDK 222 sends an attestDevice request to ingress server (operation 462) with the ciphertext signal data (e.g., that encrypted with the DAK). Ingress server 232 receives the request and validates the API keys on the request to authenticate the device (operation 463-1). If successful, ingress server 232 forwards the request to frontend server 234 (operation 463-2). Frontend server 234 receives the request and uses token server 236 to cache the ciphertext signal data in cache 246 and redact sensitive fields on the request (463-2). The scrubbed request is forwarded to transaction API servers 238 (operation 464).

Transaction API servers 238 use the unique device identifiers to look up the key handles for the DAK, the ADK, and the PDK, attach the key handles to the request, and forward the request to attestation server 240 (operations 465 and 466).

Attestation server 240 calls (operation 467) to token server 236 to load the cached ciphertext signal data from cache 246 (operation 468). Attestation server 240 receives the data back (operation 469) and rebuilds the request body including generating a digest from the request (operation 470), and calls to token server 236 with the specified DAK handle to validate the signature (operation 471).

Token server 236 validates the signature by loading the public DAK from the DKS, and comparing the signature with that of the provided digest (operation 472). If successful, attestation server 240 calls to token server 236 with the ADK key handle to get the plaintext signal data (operation 473).

Token server 236, upon receiving the ADK key handle, loads the cached ciphertext signal data from cache 246, loads the ADK from the key store using the received handle 248, and decrypts the signal data (operation 474). After decryption, token server 236 returns the plaintext signal data to attestation server 240 (operation 475-1). Attestation server 240 inspects the plaintext signal data and makes a decision on the terminal device's 220 integrity (e.g., based on a matching the received/decrypted signal data with signal data known about the device 220), and asynchronously flushes the signal data to a signal data data store (not shown) (operation 475-2). In some embodiments, for signal data coming from a third party certificate system, such as GOOGLE SAFETY NET™ signal data, attestation server 240 will verify the authenticity of the data by checking the signature, validating the certificate chain by communicating with the third party certificate system, and ensuring that the expected parameters (i.e., the nonce) match that generated by the third party certificate system.

In embodiments, when integrity is validated, attestation server 240 calls to token server to generate an attestation cryptogram (operation 475-3). In embodiments, on successful device attestation, the attestation process discussed herein generates an attestation cryptogram. This cryptogram is used during transaction processing to validate the integrity of the device attempting to make a charge. In embodiments, token server 236 generates this cryptogram (operation 476). In embodiments the cryptogram if formed by generating a message including one or more of the following values: an ID of the RSA key being used to encrypt data, a cryptogram expiration time, a session identifier, and a PDK key handle. The message is then encrypted using the ACK. Thus, in embodiments token server 236 generates a cryptogram with the provided input, encrypts the cryptogram using the ACK, caches the cryptogram in cache 246, and returns the cryptogram and cache ID to attestation server (operation 475-4).

Attestation server 240 uses the cryptogram to build a response, generates a digest, and calls to token server to sign it using the AAK (operation 476). Attestation server then returns the scrubbed response to transaction API servers 238 (operation 477), which returns it to frontend server (operation 478).

Frontend server 234 calls token server to load the attestation cryptogram from the cache, attaches it to the response (operation 479-1), and returns the full payload to the device 220 (operation 479-2).

In embodiments, the SDK 222 authenticates the response by validating the signature using the public AAK, and stores the attestation cryptogram in application memory (operation 479-3). The attestation cryptogram is then used in transaction processing by the commerce platform server(s) as an attestation of the device's integrity (e.g., completion of the process of FIG. 4C).

Figure 4D:
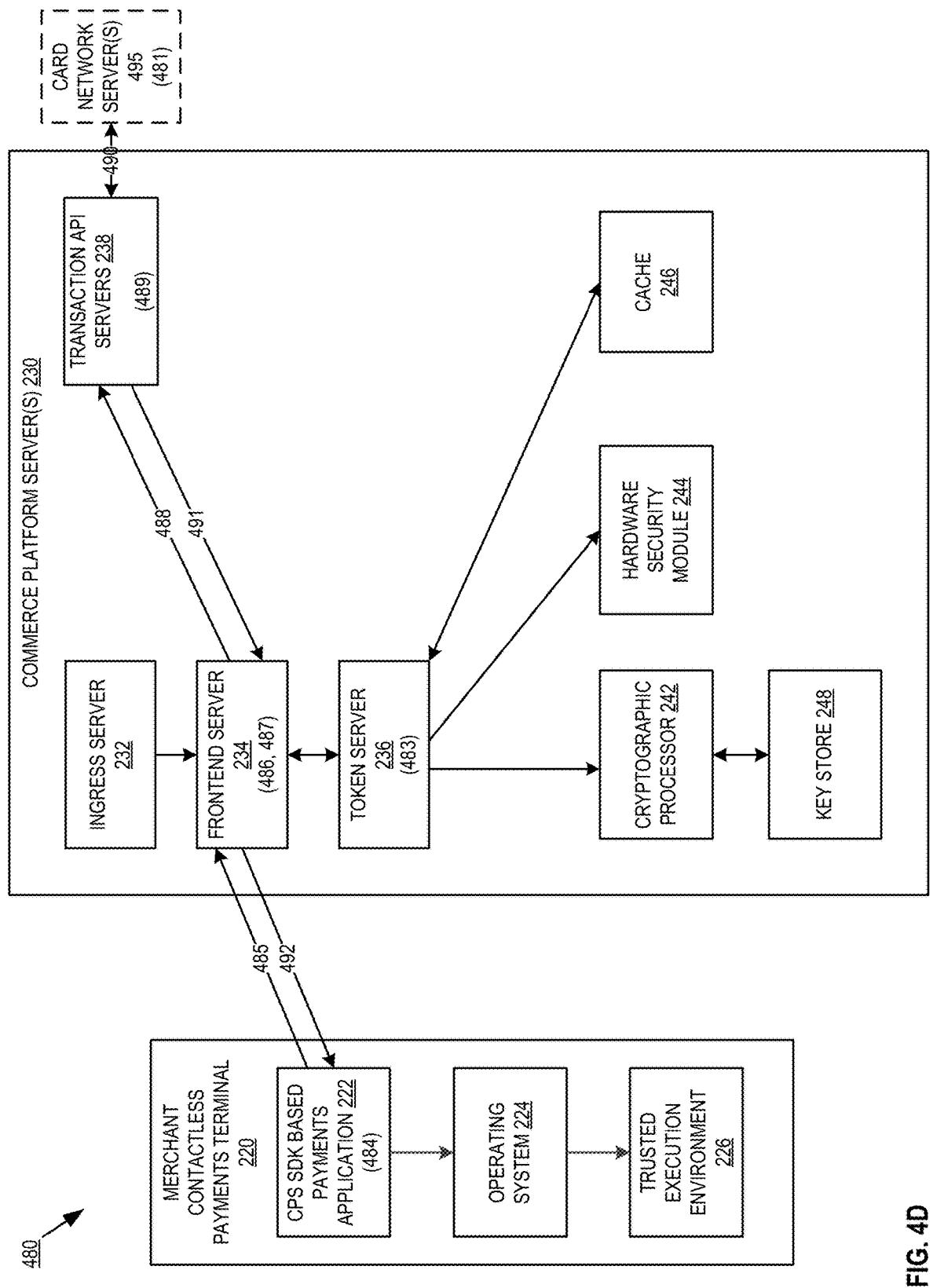
FIG. 4D illustrates one embodiment of a process for protocols and operations for processing a contactless payments transaction.

FIG. 4D illustrates one embodiment of a process 480 for protocols and operations for processing a contactless payments transaction. In an embodiment, the payments application 222 processes a transaction including capturing payment data using a wireless reader (e.g., capturing wireless payment data from a mobile device, an EMV chip, etc.) associated with a charge to be processed as a payment (operation 484).

SDK 222 of the payments terminal 220 sends the attestation cryptogram along with the charge request to front end server (operation 485). Frontend server 234 will decrypt the payload of the cryptogram using the ACK (operation 486). Frontend server then perform a set of validation operation (operation 487). In embodiments, the validations verification of the following:

Verification that the current attestation is within the valid time window based on the cryptograph time (current time−attestation time<~15 minutes);

The session identifier embedded within the cryptogram matches that in the request;

The PDK identifier embedded within the cryptogram matches the key ID previously stored for device 220 during the binding process (FIG. 4A). Since this key was generated within the TEE 226 on the device 220, this ensures that only the correct device 220 can use this cryptogram; and The request device signature matches that of the request.

If any of the above verifications fail, frontend server 234 will abort the auth process, which will prevent the charge being processed in the present payment from being successful. However, if the verifications success, the payment is forwarded by frontend server 234 to transaction API servers 238 (operation 488).

Transaction API servers 238 then process the payment for the transaction with card network server(s) 495 (operation 490). This can include verifying an account, verifying an availability of funds, collecting payment, etc. In embodiments, card network server(s) 495 are not part of commerce platform server(s) 230, and are instead remote server, and are therefore illustrated using dashed line. The transaction result obtained by transaction API servers 238 interacting with card network server(s) 495 (e.g., authorized, decline, or other) is passed to frontend server 234 (operation 491), which is transmitted to SDK 222.

SDK upon receiving the transaction processing result renders a display and or takes one or more other actions (operation 493), such as notifying a merchant, generating and transmitting a receipt, performing additional transactions, etc.

Therefore, as discussed above, a device's integrity and the software executing on that device may be securely attested to from the time an application is provisioned to that device through a later transaction. This ensures security of sensitive information communicated during transaction using encryption and the keys discussed above. Furthermore, fraudulent transaction prevention is improved using by using encryption to ensure a device originating a transaction is the actual device associated with encryption keys and a cryptogram, leveraging a device's trusted execution environment and leveraging a third party certificate system to attest to that device's integrity, rotating key to prevent replay style attacks, expiring cryptograms to cause the noted key rotation, as well as other measures discussed above.

Figure 5:
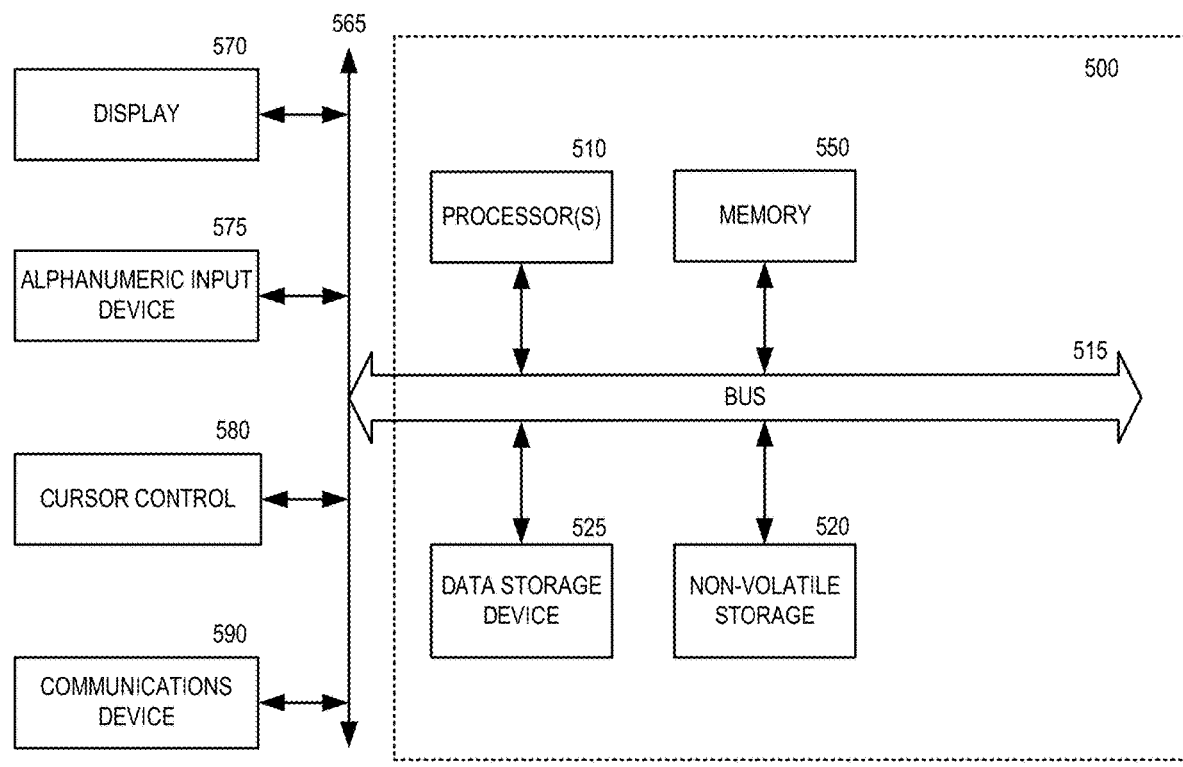
FIG. 5 is one embodiment of a computer system that may be used to support the systems and operations discussed herein.

FIG. 5 is one embodiment of a computer system that may be used to support the systems and operations discussed herein. It will be apparent to those of ordinary skill in the art, however that other alternative systems of various system architectures may also be used.

The data processing system illustrated in FIG. 5 includes a bus or other internal communication means 515 for communicating information, and one or more processor(s) 510 coupled to the bus 515 for processing information. The system further comprises a random access memory (RAM) or other volatile storage device 550 (referred to as memory), coupled to bus 515 for storing information and instructions to be executed by processor(s) 510. Main memory 550 also may be used for storing temporary variables or other intermediate information during execution of instructions by processor(s) 510. The system also comprises a read only memory (ROM) and/or static storage device 520 coupled to bus 515 for storing static information and instructions for processor(s) 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor(s) 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

It will be apparent to those of ordinary skill in the art that the system, method, and process described herein can be implemented as software stored in main memory or read only memory and executed by processor. This control logic or software may also be resident on an article of manufacture comprising a non-transitory computer readable medium having computer readable program code embodied therein and being readable by the mass storage device and for causing the processor to operate in accordance with the methods and teachings herein.

The embodiments discussed herein may also be embodied in a handheld or portable device containing a subset of the computer hardware components described above. For example, the handheld device may be a mobile telephone, tablet computer, special purpose computer device, etc. configured to contain only the bus, the processor, and memory. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor, a data storage device, a bus, and memory, and only rudimentary communications mechanisms, such as a small touch-screen that permits the user to communicate in a basic manner with the device. In general, the more special-purpose the device is, the fewer of the elements need be present for the device to function.

Figure 6:
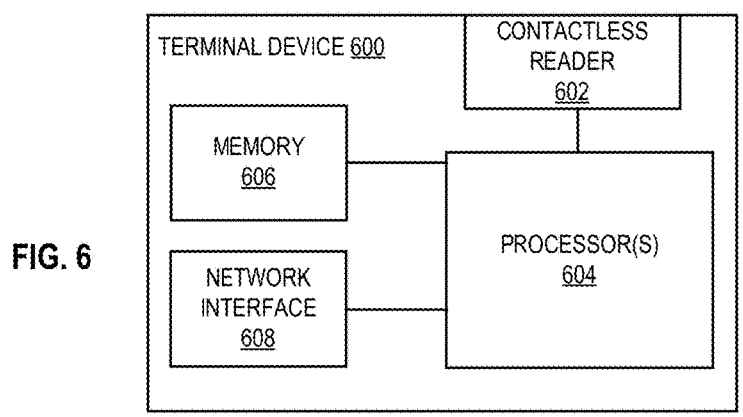
FIG. 6 is one embodiment of a device having a contactless reader that may be used to support the systems and operations discussed herein.

FIG. 6 is a block diagram of one embodiment of a terminal device 600. The terminal device 600 provides additional details for the terminal devices discussed herein.

In one embodiment, the terminal device is a system, which may include a contactless reader 602, one or more processors 604, a memory 606, a network interface 608. Terminal device 600 may also include a number of processing modules, which may be implemented as hardware, software, firmware, or a combination. It should be appreciated that terminal device 600 may also include, although not illustrated, a user interface (e.g., keyboard, touch-screen, buttons, or similar user input devices), a power device (e.g., a battery), as well as other components typically associated with electronic devices. Network interface 608 of terminal device 600 may also be coupled to a number of wireless subsystems (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems).

The memory 606 may be coupled to processor(s) 604 to store instructions for execution by processor(s) 604. In some embodiments, the memory is non-transitory. It should be appreciated that embodiments as described herein may be implemented through the execution of instructions, for example as stored in the memory 606 or other element, by processor(s) 604 of the terminal device 600 and/or other circuitry of the terminal device 600. Particularly, circuitry of the terminal device 600, including but not limited to processor and reader, may operate under the control of a program, routine, or the execution of instructions to execute methods or processes in accordance with the embodiments described herein. For example, such a program may be implemented in firmware or software (e.g. stored in memory and/or other locations) and may be implemented by processors, such as processor and reader, and/or other circuitry of the reader devices. Further, it should be appreciated that the terms processor, microprocessor, circuitry, controller, etc., may refer to any type of logic or circuitry capable of executing logic, commands, instructions, software, firmware, functionality and the like.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method for a commerce platform system validating integrity of an environment of a terminal device in which an application is installed and running on the terminal device remote to the commerce platform system, the method comprising:
   receiving, at the commerce platform system from the terminal device, a device provisioning request that comprises data indicative of an instance of an application installed on the terminal device, a first public key, a second public key, and a hardware attestation key, the first public key, the second public key, and the hardware attestation key generated within a trusted execution environment of the terminal device, and the first public key and the second public key having a corresponding first private key and second private key stored within the trusted execution environment;
   verifying, by the commerce platform system, the first public key and the second public key as being generated by the trusted execution environment of the terminal device using the hardware attestation key, the hardware attestation key generated at least in part using the first public key, the second public key, and the data indicative of the instance of the application;
   when the first public key and the second public key are successfully verified, storing the first public key, the second public key, and the data indicative of the instance of the application in a data store with one or more identifiers that map each of the first public key and the second public key to the data indicative of the instance of the application;
   receiving, by the commerce platform system from the terminal device, a device attestation request that comprises purported data indicative of the instance of an application, the device attestation request comprising a signature purported to be generated by the trusted execution environment of the terminal device using the first private key;
   in response to validating the signature using the first public key stored in the data store, comparing the purported data indicative of the instance of the application with the data indicative of an instance of an application stored in the data store; and
   when the purported data indicative of the instance of the application matches the data indicative of the instance of the application stored in the data store, validating integrity of the environment of the terminal device in which the instance of the application is installed and running on the terminal device.

2. The method of claim 1, wherein in response to validating integrity of the environment of the terminal device, the method further comprises:
   generating an attestation cryptogram, the attestation cryptogram comprising one or more identifiers, wherein the attestation cryptogram is associated with an expiration date that is stored within the data store;
   encrypting the attestation cryptogram with a symmetric encryption key; and
   transmitting the encrypted attestation cryptogram to the terminal device, wherein the attestation cryptogram is to be included in transaction requests originated by the terminal device as an indication of integrity of the terminal device and the instance of the application installed on the terminal device.

3. The method of claim 2, further comprising:
   receiving, from the instance of the application installed on the terminal device, a request to refresh the attestation cryptogram;
   receiving, form the instance of the application installed on the terminal device, a second device attestation request; and
   in response to validating an integrity of the terminal device and the instance of the application installed on the terminal device using the second device attestation request, generating and transmitting a second attestation cryptogram to the terminal device.

4. The method of claim 2, wherein the terminal device comprises a mobile device with a contactless interface for collecting contactless payment data during a transaction processed by the instance of the application, wherein a transaction request having the collected contactless payment data comprises the attestation cryptogram.

5. The method of claim 1, wherein verifying the first public key and the second public key using the hardware attestation key comprises:
  verifying, with a certificate authority system, an integrity of the hardware attestation key as having been generated by the trusted execution environment of the terminal device; and
  using, by the commerce platform system, verification of the integrity of the hardware attestation key as a verification of the first public key and the second public key.

6. The method of claim 1, wherein installation of the application on the terminal device causes one or more functions of a software development kit (SDK) integrated into the application to instruct the trusted execution environment to generate the first public key, the second public key, and the hardware attestation key, and to generate and transmit the device provisioning request to the commerce platform system.

7. The method of claim 1, wherein the device attestation request is encrypted using a symmetric encryption key, and the method further comprises:
  prior to validating the signature using the first public key stored in the data store, using identification data indicative of instance of the application included in the device attestation request to access a corresponding symmetric encryption key that is associated with the instance of the application;
  attempting to decrypt the device attestation request using the corresponding symmetric encryption key; and
  when the device attestation request is decrypted using the corresponding symmetric encryption key, extracting the data indicative of the instance of an application from a decrypted version of the device attestation request.

8. The method of claim 7, further comprising:
  receiving a key rotation request comprising an identification of the symmetric encryption key and an identifier of the instance of the application;
  generating, by the commerce platform system, a new symmetric encryption key that is associated with the data indicative of instance of the application and stored in the data store;
  accessing the second public key associated with the data indicative of the instance of the application;
  encrypting the new symmetric encryption key using the second public key; and
  transmitting the encrypted new symmetric encryption key to the terminal device, causing the terminal device to decrypt the new symmetric encryption key using the second private key within the trusted execution environment, and store a decrypted new symmetric encryption key in a memory of the trusted execution environment.

9. The method of claim 1, wherein the data indicative of the instance of an application comprises at least one of an identifier of the instance of the application, an identifier of the terminal device, sensor data collected from the terminal device, one or more parameters of the application, one or more parameters of the terminal device, a hash value generated from at least a part of the instance of the application, a third party attestation of integrity of hardware the terminal device, and a third party attestation of integrity of an operating system of the terminal device.

10. The method of claim 1, wherein plaintext versions of the first private key and the second private key are never exposed outside of the trusted execution environment of the terminal device.

11. The method of claim 1, wherein the environment of the terminal device in which the application is installed and running on the terminal device comprises the terminal device, an application, and a software development kit (SDK) integrated into the application.

12. A non-transitory machine readable medium having instructions stored thereon, which when executed by a computing system, cause the computing system to perform operations for a commerce platform system validating integrity of an environment of a terminal device in which an application is installed and running on the terminal device remote to the commerce platform system, the operations, comprising:
  receiving, at the commerce platform system from the terminal device, a device provisioning request that comprises data indicative of an instance of an application installed on the terminal device, a first public key, a second public key, and a hardware attestation key, the first public key, the second public key, and the hardware attestation key generated within a trusted execution environment of the terminal device, and the first public key and the second public key having a corresponding first private key and second private key stored within the trusted execution environment;
  verifying, by the commerce platform system, the first public key and the second public key as being generated by the trusted execution environment of the terminal device using the hardware attestation key, the hardware attestation key generated at least in part using the first public key, the second public key, and the data indicative of the instance of the application;
  when the first public key and the second public key are successfully verified, storing the first public key, the second public key, and the data indicative of the instance of the application in a data store with one or more identifiers that map each of the first public key and the second public key to the data indicative of the instance of the application;
  receiving, by the commerce platform system from the terminal device, a device attestation request that comprises purported data indicative of the instance of an application, the device attestation request comprising a signature purported to be generated by the trusted execution environment of the terminal device using the first private key;
  in response to validating the signature using the first public key stored in the data store, comparing the purported data indicative of the instance of the application with the data indicative of an instance of an application stored in the data store; and
  when the purported data indicative of the instance of the application matches the data indicative of the instance of the application stored in the data store, validating integrity of the environment of the terminal device in which the instance of the application is installed and running on the terminal device.

13. The non-transitory machine readable medium of claim 12, wherein in response to validating integrity of the environment of the terminal device, the method further comprises:
  generating an attestation cryptogram, the attestation cryptogram comprising one or more identifiers, wherein the attestation cryptogram is associated with an expiration date that is stored within the data store;

encrypting the attestation cryptogram with a symmetric encryption key; and transmitting the encrypted attestation cryptogram to the terminal device, wherein the attestation cryptogram is to be included in transaction requests originated by the terminal device as an indication of integrity of the terminal device and the instance of the application installed on the terminal device.

14. The non-transitory machine readable medium of claim 13, further comprising:

receiving, from the instance of the application installed on the terminal device, a request to refresh the attestation cryptogram;

receiving, form the instance of the application installed on the terminal device, a second device attestation request; and in response to validating an integrity of the terminal device and the instance of the application installed on the terminal device using the second device attestation request, generating and transmitting a second attestation cryptogram to the terminal device.

15. The non-transitory machine readable medium of claim 12, wherein verifying the first public key and the second public key using the hardware attestation key comprises:

verifying, with a certificate authority system, an integrity of the hardware attestation key as having been generated by the trusted execution environment of the terminal device; and using, by the commerce platform system, verification of the integrity of the hardware attestation key as a verification of the first public key and the second public key.

16. The non-transitory machine readable medium of claim 12, wherein installation of the application on the terminal device causes one or more functions of a software development kit (SDK) integrated into the application to instruct the trusted execution environment to generate the first public key, the second public key, and the hardware attestation key, and to generate and transmit the device provisioning request to the commerce platform system.

17. The non-transitory machine readable medium of claim 12, wherein the device attestation request is encrypted using a symmetric encryption key, and the method further comprises:

prior to validating the signature using the first public key stored in the data store, using identification data indicative of instance of the application included in the device attestation request to access a corresponding symmetric encryption key that is associated with the instance of the application; and attempting to decrypt the device attestation request using the corresponding symmetric encryption key; and when the device attestation request is decrypted using the corresponding symmetric encryption key, extracting the data indicative of the instance of an application from a decrypted version of the device attestation request.

18. The non-transitory machine readable medium of claim 17, further comprising:

receiving a key rotation request comprising an identification of the symmetric encryption key and an identifier of the instance of the application;

generating, by the commerce platform system, a new symmetric encryption key that is associated with the data indicative of instance of the application and stored in the data store;

accessing the second public key associated with the data indicative of the instance of the application;

encrypting the new symmetric encryption key using the second public key; and transmitting the encrypted new symmetric encryption key to the terminal device, causing the terminal device to decrypt the new symmetric encryption key using the second private key within the trusted execution environment, and store a decrypted new symmetric encryption key in a memory of the trusted execution environment.

19. The non-transitory machine readable medium of claim 12, wherein the data indicative of the instance of an application comprises at least one of an identifier of the instance of the application, an identifier of the terminal device, sensor data collected from the terminal device, one or more parameters of the application, one or more parameters of the terminal device, a hash value generated from at least a part of the instance of the application, a third party attestation of integrity of hardware the terminal device, and a third party attestation of integrity of an operating system of the terminal device.

20. A commerce platform system that validates integrity of an environment of a terminal device in which an application is installed and running on the terminal device remote to the commerce platform system, comprising:

a memory; and a processor coupled with the memory and configured to:

receive, at the commerce platform system from the terminal device, a device provisioning request that comprises data indicative of an instance of an application installed on the terminal device, a first public key, a second public key, and a hardware attestation key, the first public key, the second public key, and the hardware attestation key generated within a trusted execution environment of the terminal device, and the first public key and the second public key having a corresponding first private key and second private key stored within the trusted execution environment, verify, by the commerce platform system, the first public key and the second public key as being generated by the trusted execution environment of the terminal device using the hardware attestation key, the hardware attestation key generated at least in part using the first public key, the second public key, and the data indicative of the instance of the application, when the first public key and the second public key are successfully verified, store the first public key, the second public key, and the data indicative of the instance of the application in the memory with one or more identifiers that map each of the first public key and the second public key to the data indicative of the instance of the application, receive, by the commerce platform system from the terminal device, a device attestation request that comprises purported data indicative of the instance of an application, the device attestation request comprising a signature purported to be generated by the trusted execution environment of the terminal device using the first private key, in response to validating the signature using the first public key stored in the data store, compare the purported data indicative of the instance of the application with the data indicative of an instance of an application stored in the data store, and when the purported data indicative of the instance of the application matches the data indicative of the instance of the application stored in the data store, validate integrity of the environment of the terminal device in which the instance of the application is installed and running on the terminal device.

* * * * *